(12) United States Patent
Song et al.

(10) Patent No.: US 11,164,475 B2
(45) Date of Patent: Nov. 2, 2021

(54) VIRTUAL EXPERIENCE DEVICE FOR AVIATION LEISURE SPORTS

(71) Applicant: 3D INTERACTIVE CO., LTD., Daejeon (KR)

(72) Inventors: Keumpil Song, Sejong (KR); Dong-Hyuk Kim, Daejeon (KR); Moon-Yong Seo, Seoul (KR); Kwang-Hyun Kim, Daejeon (KR); Bok-Dong Choi, Daejeon (KR); Sang-Man Park, Daejeon (KR)

(73) Assignee: 3D INTERACTIVE CO., LTD., Daejeon (KR)

( * ) Notice: Subject to any disclaimer, the term of this patent is extended or adjusted under 35 U.S.C. 154(b) by 403 days.

(21) Appl. No.: 16/329,667

(22) PCT Filed: Dec. 27, 2016

(86) PCT No.: PCT/KR2016/015304
§ 371 (c)(1),
(2) Date: Feb. 28, 2019

(87) PCT Pub. No.: WO2018/043838
PCT Pub. Date: Mar. 8, 2018

(65) Prior Publication Data
US 2019/0197914 A1   Jun. 27, 2019

(30) Foreign Application Priority Data
Sep. 1, 2016  (KR) .......................... 10-2016-0112827

(51) Int. Cl.
*G09B 9/00* (2006.01)
*A63G 31/16* (2006.01)
(Continued)

(52) U.S. Cl.
CPC ............... *G09B 9/00* (2013.01); *A63G 31/16* (2013.01); *B64D 23/00* (2013.01); *A63G 2031/005* (2013.01)

(58) Field of Classification Search
CPC .......... A63G 31/00; A63G 31/16; G09B 7/00; G09B 9/00; A63B 69/00
(Continued)

(56) References Cited

U.S. PATENT DOCUMENTS

2018/0134420 A1* 5/2018 Kwon ....................... F16H 7/08
2019/0318646 A1* 10/2019 Yeom ..................... A63G 31/00

FOREIGN PATENT DOCUMENTS

JP   08-173583 A      7/1996
KR   10-1212445 B1   12/2012
(Continued)

*Primary Examiner* — Kien T Nguyen
(74) *Attorney, Agent, or Firm* — Stein IP, LLC

(57) ABSTRACT

Provided is a virtual experience device for aviation leisure sports, the device including: a main frame configured to form a vertical pillar and having an accommodation space in a region of an inside of the main frame; a bottom frame connected to the main frame and configured to form a bottom surface of the virtual experience device for aviation leisure sports; an upper frame extending from the main frame in a horizontal direction and having an accommodation space in a region of an inside of the upper frame and at least one through hole formed in a bottom surface of the upper frame; side frames installed at both sides of the upper frame and configured to support a load of the upper frame; and at least one roller provided in the accommodation space of the upper frame and configured to change a progression direction of a traction wire connected to a harness that will be put on by a user for a leisure sports aircraft virtual experience, wherein a motor portion for adjusting a usage length of the traction wire is provided at a top end of the main frame.

7 Claims, 7 Drawing Sheets

(51) Int. Cl.
*B64D 23/00* (2006.01)
*A63G 31/00* (2006.01)

(58) Field of Classification Search
USPC .................. 472/59–61, 130; 434/55, 34, 47
See application file for complete search history.

(56) References Cited

FOREIGN PATENT DOCUMENTS

| | | |
|---|---|---|
| KR | 10-2014-0066934 A | 6/2014 |
| KR | 10-1546408 B1 | 8/2015 |
| KR | 10-2016-0063019 A | 6/2016 |

\* cited by examiner

VIRTUAL EXPERIENCE DEVICE FOR AVIATION LEISURE SPORTS

CROSS-REFERENCE TO RELATED APPLICATIONS

This application is a national stage of International Application No. PCT/KR2016/015304, filed Dec. 27, 2016, which claims the benefit of Korean Application No. 10-2016-0112827, filed Sep. 1, 2016, in the Korean Intellectual Property Office, the disclosures of which are incorporated herein by reference.

TECHNICAL FIELD

The present invention relates to a virtual experience device for AVIATION leisure sports, and more particularly, a virtual experience device in which aviation leisure sports using a parachute or wingsuit flying can be virtually experienced on the ground.

BACKGROUND ART

Recently, many persons experience a variety of leisure sports using a leisure time. A representative leisure sport among them is aviation leisure sports.

For example, skydiving is aviation leisure sports in which a person climbs a high place using an aircraft or balloon and then puts on a parachute and jumps to do a free fall or perform several motions, unfolds the parachute at a certain altitude and makes a safe landing, and wingsuit flying is aviation leisure sports in which a person puts on a wingsuit as a specific parachute falling suit for a downhill that adds clothe between his/her own hands and feet and then jumps from a cliff or aircraft to do a downhill.

However, in these aviation leisure sports, when, basically, a parachute is not unfolded or a person collides with another object, there is a risk in which the person is seriously injured or dies.

In addition, aviation leisure sports require a means for climbing a high place, for example, an aircraft, and require high-priced equipment so as to guarantee stability. Thus, considerable cost investment is essential to enjoy leisure sports.

This risk and relatively high cost burden are obstacles to aviation leisure sports experience of more persons.

Thus, provision of a device or service that enables a person to enjoy experiences due to aviation leisure sports more safely, is required.

Thus, technology related to a device that enables a parachute training virtually has been already suggested. For example, Korean Patent Registration No. 10-1473291 discloses a falling training simulator including a human body response effect.

However, in methods according to the related art, an operation plate is provided at a harness wearer's upper part so that, as the operation plate is moved, the harness wearer's position is changed. In this way, when a predetermined operation plate is used, power consumption is large, and the harness wearer's position change and control is not precise.

Furthermore, in methods according to the related art, as shown in FIGS. 1 and 3 of Korean Patent Registration No. 10-1473291, a driving unit such as a motor is installed on the harness wearer's head so that there is a risk in safety and it is not easy to install a structure for supporting them.

DISCLOSURE OF THE INVENTION

The present invention provides a device that enables more persons to enjoy aviation leisure sports experience safely on the ground.

According to an aspect of the present invention, there is provided a virtual experience device for aviation leisure sports, the device including: a main frame configured to form a vertical pillar and having an accommodation space in a region of an inside of the main frame; a bottom frame connected to the main frame and configured to form a bottom surface of the virtual experience device for aviation leisure sports; an upper frame extending from the main frame in a horizontal direction and having an accommodation space in a region of an inside of the upper frame and at least one through hole formed in a bottom surface of the upper frame; side frames installed at both sides of the upper frame and configured to support a load of the upper frame; and at least one roller provided in the accommodation space of the upper frame and configured to change a progression direction of a traction wire connected to a harness that will be put on by a user for aviation leisure sports virtual experience, wherein a motor portion for adjusting a usage length of the traction wire is provided at a top end of the main frame.

BEST MODE FOR CARRYING OUT THE INVENTION

Hereinafter, the present invention will be described more fully with reference to the accompanying drawings, in which exemplary embodiments of the invention are shown.

Hereinafter, each of embodiments according to the present invention is just one example for helping understanding of the present invention, and the present invention is not limited thereto. In particular, the present invention may include at least one combination of individual elements included in each embodiment.

Figure 1:
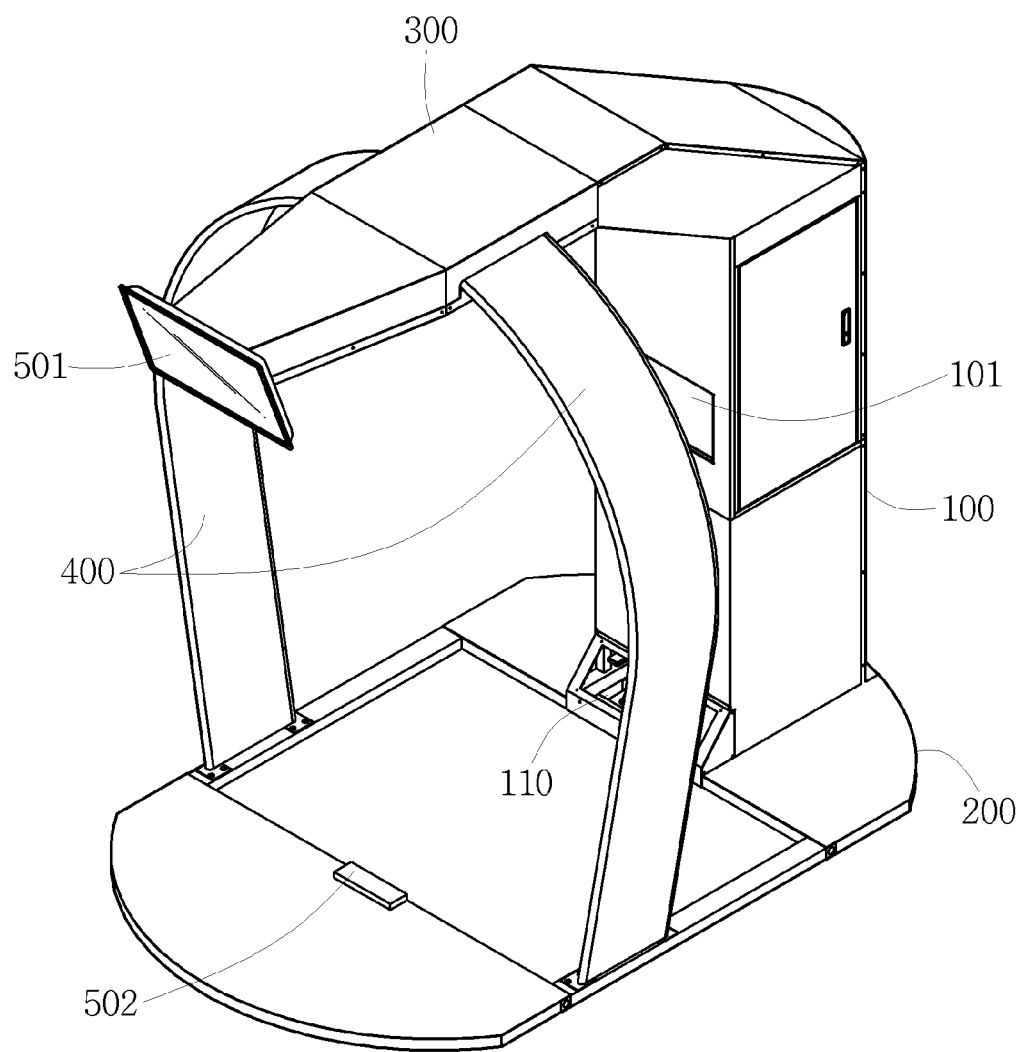
FIG. 1 is a perspective view of a virtual experience device for aviation leisure sports according to an embodiment of the present invention.

A perspective view illustrating the appearance of a virtual experience device for aviation leisure sports according to an embodiment of the present invention (hereinafter, referred to as a 'virtual experience device for aviation leisure sports') is as shown in FIG. 1.

As illustrated in the same drawing, the appearance of the virtual experience device for aviation leisure sports largely includes a main frame 100, an upper frame 300, a bottom frame 200, and side frames 400.

The main frame 100 forms a vertical pillar and has an accommodation space formed in a region of the inside of the main frame 100.

The bottom frame 200 is connected to the main frame 100, forms a bottom surface of the virtual experience device for aviation leisure sports, is connected to the main frame 100 and the side frames 400 so as to absorb a load of an upper portion of the virtual experience device for aviation leisure sports, as shown in FIG. 1.

The upper frame 300 extends from the main frame 100 in a horizontal direction and has an accommodation space formed in a region of the inside of the upper frame 300 and at least one through hole 302, 303, 304, 305, 306, 307, or 308 formed in a bottom surface of the upper frame 300. A traction wire or control wire passes through the through hole formed in the bottom surface of the upper frame 300, as will be described later, and formations positons thereof will be described below.

The side frames 400 are installed at both sides of the upper frame 300 and supports a load of the upper frame 300.

Figure 2:
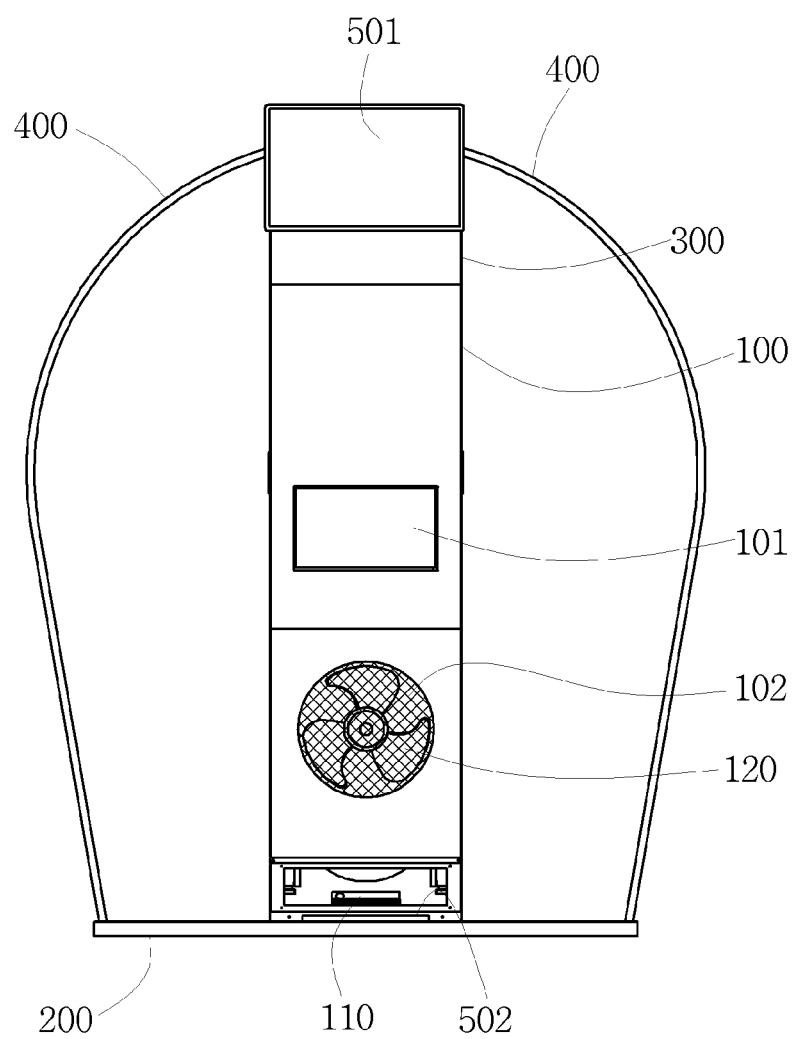
FIG. 2 is a front view of the virtual experience device for aviation leisure sports of FIG. 1.
Figure 3:
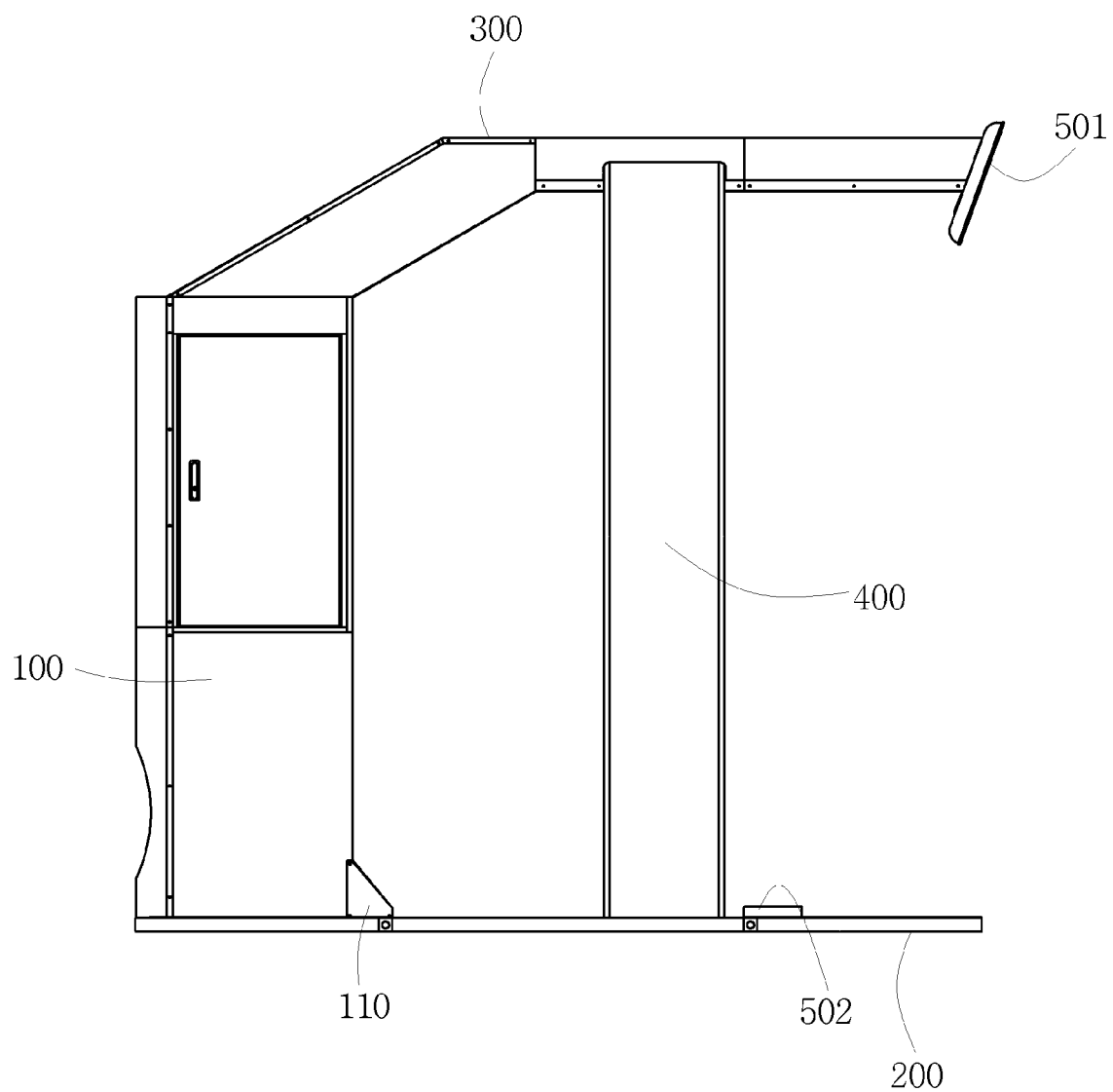
FIG. 3 is a left side view of the virtual experience device for aviation leisure sports of FIG. 1.

For your reference, FIG. 2 is a front view of a virtual experience device for aviation leisure sports according to an embodiment, and FIG. 3 is a left side view thereof.

Figure 4:
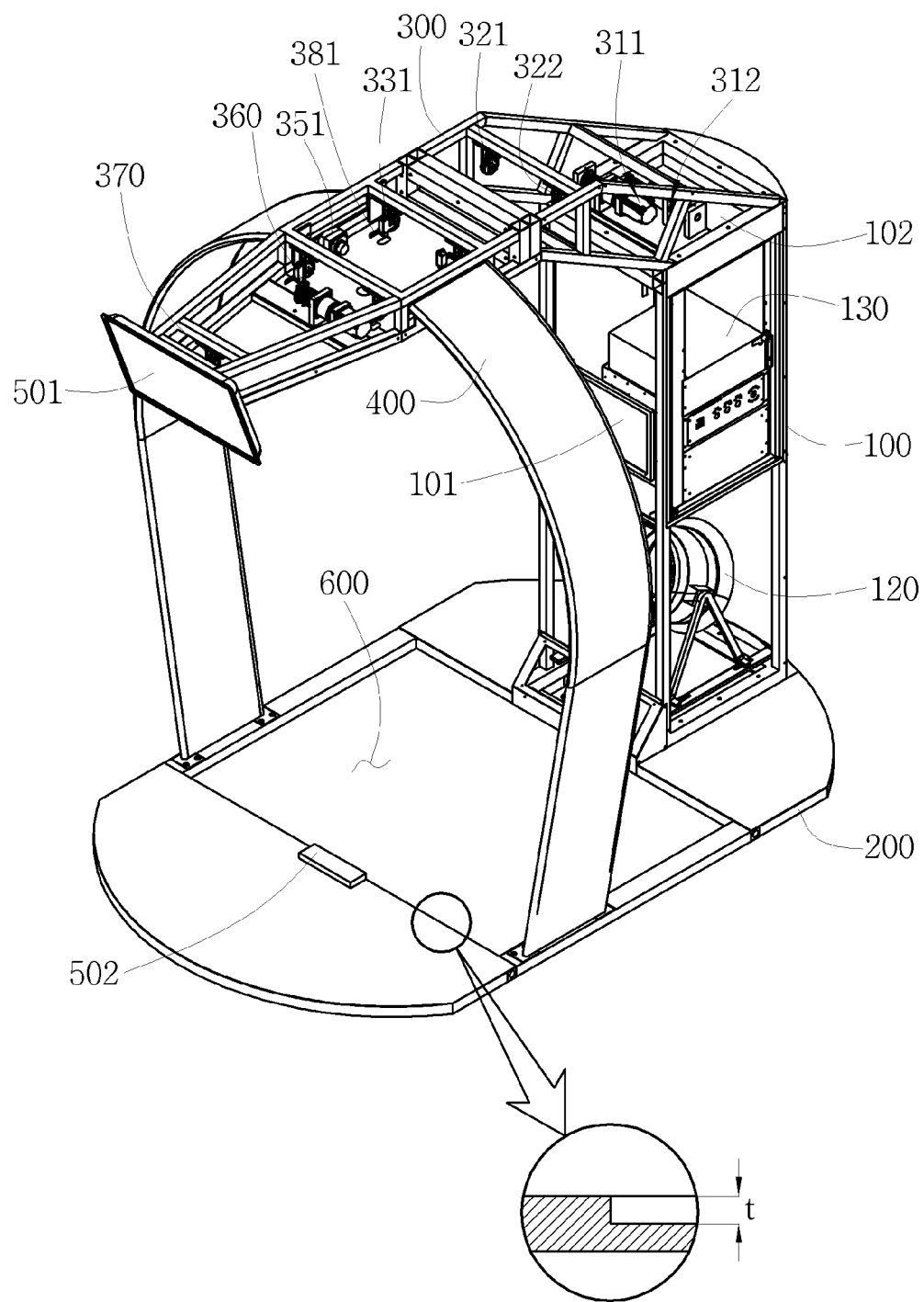
FIG. 4 is a view illustrating an inside of an upper frame and a main frame of the perspective view of the virtual experience device for aviation leisure sports of FIG. 1.

Meanwhile, a space (an accommodation space) in which certain units will be installed or attached, is formed in the main frame 100 and the upper frame 300 of the virtual experience device for aviation leisure sports, as described above. FIG. 4 illustrates a state in which external plates of the main frame 100 and the upper frame 300 are removed, for explanation thereof.

Figure 5:
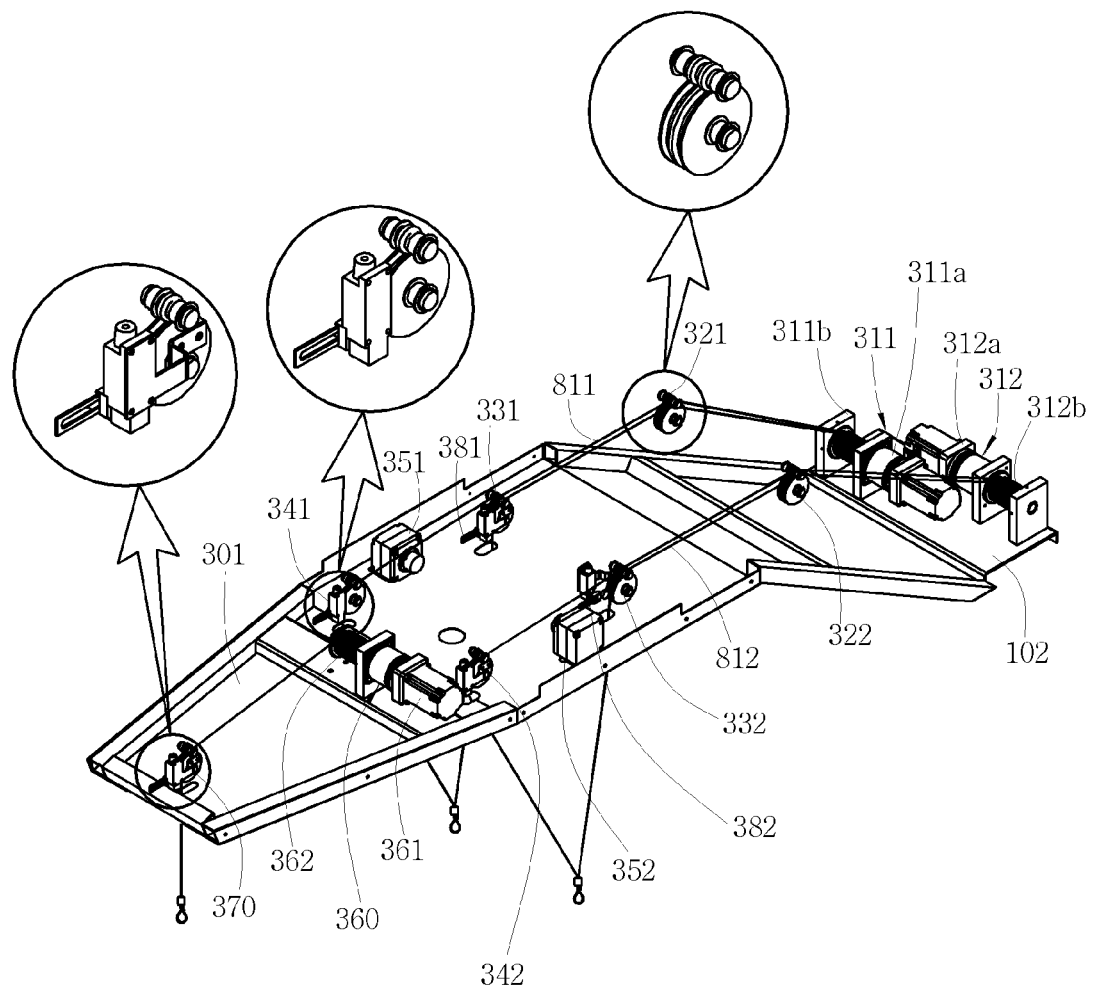
FIG. 5 is a view illustrating a bottom surface of the upper frame of FIG. 4, a top surface of the main frame of FIG. 4, and elements installed therein in detail.

Also, in order to describe installation positions and operation relationship of elements in detail, FIG. 5 illustrates the bottom surface 301 of the upper frame 300, elements being in contact with the bottom surface 301 or above the bottom surface 301, the top surface of the main frame 100, and elements installed on the top surface of the main frame 100 in priority.

Structural features of the virtual experience device for aviation leisure sports and elements installed therein will now be described in more detail with reference to FIGS. 4 and 5.

At least one roller is provided inside the upper frame 300 and changes a progression direction of the traction wire connected to a harness that will be put on by a user for a leisure sports aircraft virtual experience.

In detail, a plurality of left upper body rollers 331 and 341 and a plurality of right upper body rollers 332 and 342 may be provided in the upper frame 300 by a predetermined separation distance. Preferably, two left upper body rollers 331 and 341 and two right upper body rollers 332 and 342 may be provided, as shown in FIG. 5.

For your reference, the above-mentioned side frames 400 may be arch-shaped frames that are in contact with an outer surface of a region inside the upper frame 300 in which the plurality of left upper body rollers 331 and 341 and the plurality of right upper body rollers 332 and 342 are provided.

Because positions in which the left upper body rollers 331 and 341 and the right upper body rollers 332 and 342 are provided, correspond to portions in which the load of the upper frame 300 is increased to the maximum, the side frames 400 are provided outside this region so that the load of the upper frame 300 can be solidly supported with the minimum cost.

In particular, the side frames 400 have an arch shape so that the load of the upper portion can be uniformly dispersed.

Also, a motor portion for adjusting the usage length of the traction wire may be provided at a top end of the main frame 100. In detail, a left upper body motor portion 311 that corresponds to the plurality of left upper body rollers 331 and 341 described above and a right upper body motor portion 312 that corresponds to the plurality of right upper body rollers 332 and 342 may be provided.

Here, the left upper body motor portion 311 may control lengths of a plurality of left upper body traction wires 811 that sag downwards by passing through the plurality of left upper body rollers 331 and 341 simultaneously. Similarly, the right upper body motor portion 312 may control lengths of a plurality of right upper body traction wires 812 that sag downwards by passing through the plurality of right upper body rollers 332 and 342 simultaneously.

These motor portions may be integral motor portions around which a predetermined traction wire is wound, or may include a motor and a winding roller.

That is, the left upper body motor portion 311 may include a left upper body motor 311a and a left upper body winding roller 311b, which is fastened to or coupled to the left upper body motor 311a and around which a left traction wire is wound. Similarly, the right upper body motor portion 312 may include a right upper body motor 312a and a right upper body winding roller 312b, which is fastened to or coupled to the right upper body motor 312a and around which a right traction wire is wound.

As shown in FIG. 5, when two left upper body rollers 331 and 341 and two right upper body rollers 332 and 342 are provided, two left upper body traction wires 811 are wound around the left upper body winding roller 311b. Similarly, two right upper body traction wires 812 are wound around the right upper body winding roller 312b.

When describing the operation relationship between the motor portion and the roller, for example, when the left upper body motor 311 rotates, the left upper body winding roller 311b coupled to or fastened to the left upper body motor 311 rotates, and two wound, left upper body traction wires 811 may be simultaneously unwound or reversely, two left upper body traction wires 811 may be further wound.

When the left upper body winding roller 311b rotates and two left upper body traction wires 811 are unwound, two left upper body traction wires 811 are connected to the first left upper body rollers 331 and 341. One of the two left upper body traction wires 811 sags downwards after passing through the first left upper body rollers 331 and 341, and the other one thereof sags downwards after reaching the second left upper body rollers 331 and 341.

Thus, preferably, the first left upper body rollers 331 and 341 may be double rollers on which two wires are seated not to be twisted each other, and preferably, the second left upper body rollers 331 and 341 may be integral rollers on which one wire is seated.

Figure 6:
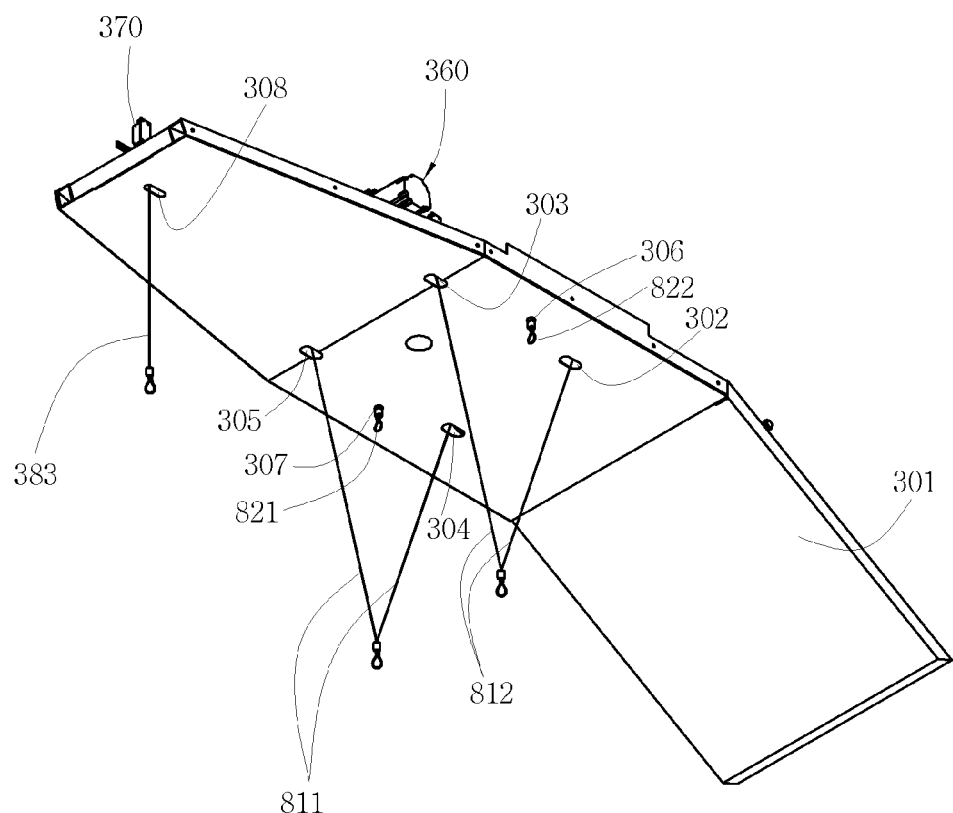
FIG. 6 is a view from a downward direction of the bottom surface of the upper frame of FIG. 5.

The shape of two left upper body traction wires 811 in which they meet each other at a ring (not shown) provided at a left shoulder point of the user's harness, is shown in FIG. 6.

For your reference, FIG. 6 is a view from a downward direction of the bottom surface 301 of the upper frame 300.

As shown in the same drawing, a plurality of through holes are formed in the bottom surface 301 of the upper frame 300. The above-described left upper body traction wires 811 sag downwards through the through holes 302 and 303.

In the above description, an operation procedure of elements provided at the left side of the virtual experience device for aviation leisure sports has been described as above. However, even in the case of the right side, the elements have corresponding relationship therebetween, and thus a redundant description thereof is omitted.

As in the present embodiment, the left upper body motor 311a and the right upper body motor 312a are separately provided, and the usage lengths of the two left upper body traction wires 811 are simultaneously controlled using the left upper body motor 311a, and the usage lengths of the two right upper body traction wires 812 are simultaneously controlled using the right upper body motor 312a. Thus, the user can feel a dynamic leisure sports aircraft using only a minimum structure.

That is, the number of traction wires may be increased. However, in this case, the number of rollers to be installed increases, and the load of the upper frame 300 is increased and thus it is not preferable.

In addition, when only one traction wire is provided at each of the left and right sides, the movement of the user who does a leisure sports aircraft virtual experience cannot be properly controlled.

In particular, in the present invention, both the left upper body motor portion 311 and the right upper body motor portion 312 are provided not at the upper frame 300 but at the top surface of the main frame 100 so that the load of the upper frame 300 can be reduced, security can be planned and costs can be reduced.

Meanwhile, as clearly shown in FIG. 2, when a portion forming a predetermined inclination angle with the main frame 100 is included in the structure of the upper frame 300, intermediate rollers 321 and 322 may be further provided, as shown in FIG. 5. In this case, the intermediate rollers 321 and 322 may be double rollers so as to prevent twisting of the upper body traction wires 811 and 812 and to minimize mutual friction.

Meanwhile, as shown in FIG. 5, a lower body motor portion 360 and a lower body roller 370 may be further provided in the upper frame 300. Because the lower body motor portion 360 and the lower body roller 370 are used to control the lower body traction wire 383 connected to a lower body part of a harness that the user for the leisure sports aircraft virtual experience wears, they may be provided at a forwarder region (a forwarder region based on a point where the upper frame 300 meets with the main frame 100) than a region in which the plurality of left upper body rollers 331 and 341 and the plurality of right upper body rollers 332 and 342 are provided, of the inside of the upper frame 300.

This is to prevent the lower body traction wire 383 for controlling the user's lower body from being in contact with or twisting with the upper body traction wires 811 and 812 for controlling the user's upper body.

Furthermore, the lower body roller 370 may be installed at a forwarder region than the lower body motor portion 360 for structural stability of the upper frame 300.

The lower body motor portion 360 may include a lower body motor 361 and a lower body winding roller 362. When describing an operation relationship, when the lower body motor 361 rotates, the lower body winding roller 362 rotates while being engaged with the lower body motor 361. Thus, the usage length of the lower body traction wire 383 that sags downwards after passing through the lower body roller 370 is controlled.

Meanwhile, a blower unit 120 that directs an upward diagonal line may be provided at a bottom end of the main frame 100. To this end, the through hole or a safety net 102 may be installed at the front of the main frame 100.

The blower unit 120 enables the user for the leisure sports aircraft virtual experience to feel wind that blows from a downward direction, as will be described later, and may be controlled so that the speed and direction of the blower unit 120 can be changed.

In addition, the virtual experience device for aviation leisure sports according to the present embodiment may further include an operation-sensing sensor that senses an operation of the user who does a leisure sports aircraft virtual experience.

Here, examples of the operation-sensing sensor include control wire sensors 351 and 352 for sensing the user's control wire operation or a Kinect sensor 110 for sensing the user's body movement.

Here, preferably, the control wire sensors 351 and 352 may be installed in an accommodation space of the upper frame 300, and preferably, the Kinect sensor 110 may be installed at a bottom end of the main frame 100 to direct an upward diagonal line.

The Kinect sensor 110 is a sensor that delivers infrared rays and compares the delivered pattern with a reflected and sensed pattern, and the structure and processing algorithm of the Kinect sensor 110 are well-known technologies and thus, a more detailed description thereof is omitted.

Preferably, the control wire sensors 351 and 352 may provide a tensile strength that causes the user to feel pulling of a control wire of a parachute actually and may perform a function of sensing the user's control wire pulling.

Meanwhile, a control unit 130 for controlling the above-described operation units may be further provided. As shown in FIG. 3, the control unit 130 may be accommodated in a part of an accommodation space of the main frame 100.

In this way, due to the accommodation space of the main frame 100, the control unit 130 is not required to be installed at a separate position, and a cable-connecting distance between the control unit 130, various sensors and driving units may be minimized.

The control unit 130 may control a motor portion, i.e., the left upper body motor 311a, the right upper body motor 312a, and the lower body motor 361 based on sensing signals received from the above-described operation-sensing sensor.

Also, the control unit 130 may control at least one of a blow direction and a blow intensity of the blower unit 120 based on the sensing signal received from the operation-sensing sensor.

Furthermore, the control unit 130 may extract an image corresponding to the sensing signal received from the operation-sensing sensor and may send the extracted image to a display unit mounted by the user.

Here, the display unit mounted by the user may be a head mounted display (HMD).

To this end, a wireless communication module may be further provided in the control unit 130. There is no limitation in a wireless communication method by which the wireless communication module communicates with the HMD 700.

In particular, as mentioned above, when the Kinect sensor 110 is provided, the control unit 130 may determine a user operation using the sensing signal received from the Kinect sensor 110 and then may extract flight dynamics information corresponding to the determined user operation, may apply a control signal corresponding to the extracted flight dynamics information to various driving units, i.e., the motor portion and the blower unit 120 and may also extract an image corresponding to the extracted flight dynamics information and may send the extracted image to the display unit mounted by the user.

Here, the flight dynamics information may be information about external pressure, wind intensity, and acceleration change, which are applied to divers under certain conditions in skydiving, for example.

Meanwhile, limit sensors 381 and 382 for determining a reference point of the above-described traction wire may be further provided. The control unit 130 may receive the sensing signal from the limit sensors 381 and 382 and may process it.

For example, the limit sensors 381 and 382 may be provided at one of the left upper body rollers 331 and 341 and one of the right upper body rollers 332 and 342, respectively, as shown in FIG. 5. The control unit 130 may forcibly stop the operation of the motor portion by receiving a reference point sensing signal from the limit sensors 381 and 382 while performing the user's leisure sports aircraft virtual experience.

This is to prevent the case where the user is injured by wound traction wire due to malfunction, in advance.

To this end, preferably, thicknesses of necessary traction wires may be different from each other at a certain positon of the traction wires so that the limit sensors 381 and 382 may sense the position.

Of course, the control unit 130 may forcibly stop the operation of the motor portion so that the traction wires may be unwound after a predetermined time elapses and the user may make a safe landing.

Meanwhile, a foot-rolling projection may be formed on the above-mentioned bottom frame 200. For example, as shown in FIG. 4, the foot-rolling projection having a predetermined height t may be formed in a forwarder region than the central part of the bottom frame 200 (in a forward region based on a point where the bottom frame 200 and the main frame 100 meet with each other), in particular, in a forwarder region than a position perpendicular to a position of the region of the bottom frame 200 at which the lower body roller 370 is provided in the upper frame 300.

The foot-rolling projection is formed to enable the user who uses the leisure sports aircraft virtual experience to feel like jumping from an airplane. When the foot-rolling projection is formed at a rewarder region than the above-described positon (in a forwarder region than the position perpendicular to the positon where the lower body roller 370 is provided in the upper frame 300), the sole of his/her own foot may be in contact with the corresponding projection during the leisure sports aircraft virtual experience, and in particular, while making a landing in a landing region 600, the user's ankle may be injured due to the corresponding projection.

A pressure-sensing sensor 502 may be provided on a top surface of the foot-rolling projection. The control unit 130 may determine a time when the leisure sports aircraft virtual experience processing starts, based on a pressure-sensing signal received from the pressure-sensing sensor 502.

That is, when it is determined that the pressure of the device for the leisure sports aircraft virtual experience is decreased to be a predetermined pressure or less, the control unit 130 determines that the user takes a jumping operation from the airplane, for example, so as to start leisure sports virtual experience processing.

Meanwhile, a predetermined monitor may be provided in the device for the leisure sports aircraft virtual experience.

For example, a first monitor 101 may be provided in the main frame 100, and a second monitor 501 may be provided in the upper frame 300.

The first monitor 101 may be a touch screen and may perform a function of selecting a leisure sports aircraft to be enjoyed by the user, or selecting various options. The second monitor 501 may display an image watched by the user through the HMD 700 in the same way so that the user for the device for the leisure sports aircraft virtual experience and neighboring his/her persons may enjoy leisure sports aircraft visually.

To this end, the first monitor 101 and the second monitor 501 are connected to the control unit 130.

As shown in FIG. 1, the upper frame 300 maintains a certain cross-sectional area while the width of the upper frame 300 is decreased as getting closer to a portion where the second monitor 501 is installed. This is to minimize the load of the upper frame 300 and to obtain a minimum area where the second monitor 501 is to be attached.

Meanwhile, in the present invention, all elements are not always provided in FIG. 1. For example, when falling using a parachute (not skydiving) is simulated, a motor or roller for controlling the user's lower body is not required, and in addition, when falling using a wingsuit is simulated, elements related to traction wires may be omitted, and controlling may be performed using only Kinect.

Furthermore, when sensing an operation using Kinect, the control unit 130 may sense the user's operation using a sensing signal received from an additional operation-sensing sensor attached to the user's body (in particular, the foot, the knee, etc.), for example.

This is to prevent the case where the user's foot operation in skydiving cannot be properly sensed in terms of an installation positon of the Kinect according to the present invention.

In addition, in the present invention, an example in which the blower unit 120 is provided only in the main frame 100, is used. However, of course, an additional blower unit 120 using a compressor may also be provided in the side frames 400.

Figure 7:
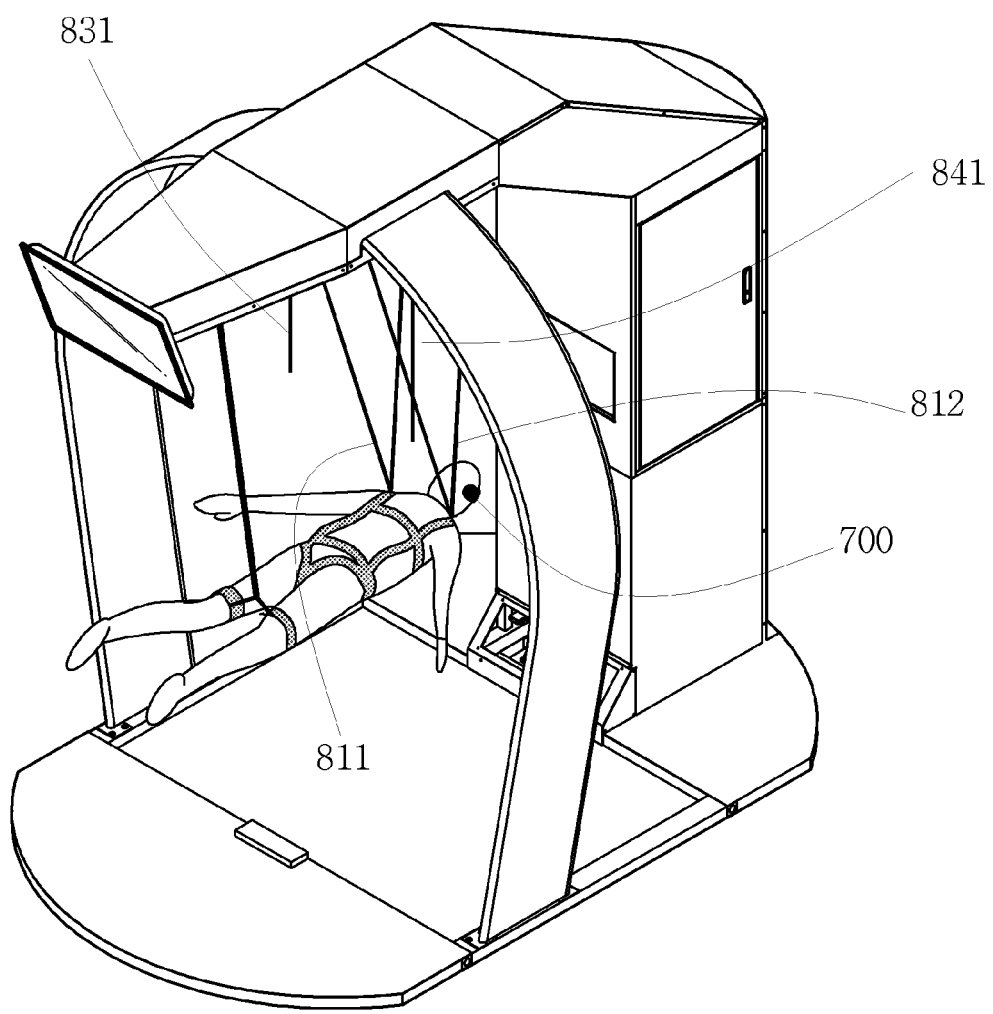
FIG. 7 is a view illustrating a state in which a user experiences the virtual experience device for aviation leisure sports according to the present invention.

Meanwhile, FIG. 7 is a view illustrating a state in which a user experiences the virtual experience device for aviation leisure sports according to the present invention.

The user is wearing the HMD 700 and is hanging using traction wires.

The user may take various operations to be performed during skydiving through a hand operation, a head operation, and a leg operation in this case, and the control unit 130 may sense the operations using the Kinect sensor 110 and thus may control winding or unwinding of various traction wires 811, 812, and 383, may control a blow intensity and a blow direction and may send a required image to the HMD 700.

In addition, the user may control the parachute by pulling control wires 831 and 841 connected to control wire connection rings 821 and 822 of control wire sensors 351 and 352 in a state where the parachute is deployed. Thus, the control unit 130 may control winding or unwinding of various traction wires 811, 812, and 383, may control the blow intensity and the blow direction and may send the required image to the HMD 700.

Meanwhile, the present invention is not limited to the above-described particular embodiment but may be modified and corrected in various ways within the scope that does not depart from the point of the present invention.

In particular, in the above-described embodiments, the lower body motor portion 360 is provided in the upper frame 300 so as to minimize an interference between the lower body traction wires 383 and the upper body traction wires 811 and 812. However, in order to minimize the load of the upper frame 300, the lower body motor portion 360 may also be provided on a top surface (a 'top surface' does not mean being necessarily exposed to the outside) of the main frame 100.

Because, in this case, the load of the upper frame 300 in a length horizontal direction is greatly reduced, the structure design of the side frames 400 that support the upper frame 300 is comparatively easy, and stability may be improved.

Preferably, in this way, when the lower body motor portion 360 may be placed in the main frame 100, a certain intermediate roller (not shown) may be further provided between the lower body motor portion 360 and the lower body roller 370 of the upper frame 300 so that the lower body traction wire 383 that starts from the lower body motor portion 360 may reach the lower body roller 370 after passing through the corresponding intermediate roller.

INDUSTRIAL APPLICABILITY

As described above, according to the present invention, the user can enjoy a leisure sports aircraft virtual experience on the ground even not using an actual airplane, etc.

In particular, a structure in which a leisure sports aircraft virtual experience can be more safely done and costs therefor can be reduced, is suggested so that the band for the leisure sports aircraft virtual experience can be expanded, and through an organic configuration between elements, the user can feel like an actual situation so that the satisfaction of the user for the leisure sports aircraft virtual experience can be improved.

The invention claimed is:

1. A virtual experience device for aviation leisure sports, the device comprising:
    a main frame configured to form a vertical pillar and having an accommodation space in a region of an inside of the main frame;
    a bottom frame connected to the main frame and configured to form a bottom surface of the virtual experience device for aviation leisure sports;
    an upper frame extending from the main frame in a horizontal direction and having an accommodation space in a region of an inside of the upper frame and at least one through hole formed in a bottom surface of the upper frame;
    side frames installed at both sides of the upper frame and configured to support a load of the upper frame;
    an operation-sensing sensor configured to sense an operation of the user who does a leisure sports aircraft virtual experience;
    a plurality of left upper body rollers, a plurality of right upper body rollers, and a lower body roller provided in the accommodation space of the upper frame, the rollers being apart from one another by a predetermined distance, and configured to change a progression direction of a traction wire connected to a harness that is to be put on by the user;
    a limit sensor provided in the accommodation space of the upper frame and configured to determine a reference point of the traction wire; and
    a control unit,
    wherein a motor portion for adjusting a usage length of the traction wire is provided at a top end of the main frame,
    wherein a foot-rolling projection having a predetermined height and having a pressure-sensing sensor on a top surface of the foot-rolling projection is formed in a forwarder region of the bottom frame than a region corresponding each position of the left upper body rollers, the right upper body rollers, and the lower body roller,
    wherein the control unit is configured to determine a time when a process of the leisure sports aircraft virtual experience starts, based on a pressure-sensing signal received from the pressure-sensing sensor, and controls the motor portion based on a sensing signal received from an operation-sensing sensor to perform the process of the leisure sports aircraft virtual experience, and to forcibly stop the operation of the motor portion by receiving a reference point sensing signal from the limit sensor.

2. The device of claim 1, wherein the left upper body motor portion simultaneously controls lengths of a plurality of left upper body traction wires that sag downwards by passing through the plurality of left upper body rollers, and the right upper body motor portion simultaneously controls lengths of a plurality of right upper body traction wires that sag downwards by passing through the plurality of right upper body rollers.

3. The device of claim 2, wherein the lower body roller is provided together with a lower body motor portion at a forwarder region than a region in which the plurality of left upper body rollers and the plurality of right upper body rollers are provided, of the inside of the upper frame, and the lower body motor portion controls a length of a lower body traction wire that sags downwards by passing through the lower body roller.

4. The device of claim 3, wherein the side frames are arch-shaped frames that are in contact with an outer surface of a region inside the upper frame in which the plurality of left upper body rollers and the plurality of right upper body rollers are provided.

5. The device of claim 1, further comprising:
    a blower unit provided at a bottom end of the main frame and directing an upward diagonal line,
    wherein the control unit is configured to control the motor portion based on a sensing signal received from the operation-sensing sensor and to control at least one of a blow direction and a blow intensity of the blower unit.

6. The device of claim 5, wherein the operation-sensing sensor is a control wire sensor installed in the accommodation space of the upper frame and configured to sense the user's control wire manipulation, and the control unit controls the motor portion and the blower unit based on a sensing signal received from the control wire sensor, extracts an image corresponding to the sensing signal and sends the extracted image to a display unit mounted by the user.

7. The device of claim 5, wherein the operation-sensing sensor is a Kinect sensor installed at a bottom end of the main frame to direct an upward diagonal line, and the control unit determines a user operation using the sensing signal received from the Kinect sensor and then extracts flight dynamics information corresponding to the determined user operation, applies a control signal corresponding to the extracted flight dynamics information to the motor portion and the blower unit, extracts an image corresponding to the extracted flight dynamics information and sends the extracted image to the display unit mounted by the user.

* * * * *